US009837121B2

(12) United States Patent
Hanai

(10) Patent No.: US 9,837,121 B2
(45) Date of Patent: Dec. 5, 2017

(54) INFORMATION PROCESSING DEVICE, INFORMATION PROCESSING METHOD, AND PROGRAM

(71) Applicant: Sony Corporation, Tokyo (JP)

(72) Inventor: Yuya Hanai, Tokyo (JP)

(73) Assignee: SONY CORPORATION, Tokyo (JP)

(*) Notice: Subject to any disclaimer, the term of this patent is extended or adjusted under 35 U.S.C. 154(b) by 242 days.

(21) Appl. No.: 14/405,934

(22) PCT Filed: Apr. 24, 2013

(86) PCT No.: PCT/JP2013/061997
§ 371 (c)(1),
(2) Date: Dec. 5, 2014

(87) PCT Pub. No.: WO2013/187131
PCT Pub. Date: Dec. 19, 2013

(65) Prior Publication Data
US 2015/0117831 A1 Apr. 30, 2015

(30) Foreign Application Priority Data
Jun. 12, 2012 (JP) ................................ 2012-133321

(51) Int. Cl.
*H04N 5/77* (2006.01)
*G11B 27/00* (2006.01)
(Continued)

(52) U.S. Cl.
CPC .......... *G11B 27/002* (2013.01); *G06T 19/006* (2013.01); *G11B 27/22* (2013.01);
(Continued)

(58) Field of Classification Search
CPC ...... H04N 5/772; H04N 1/2112; H04N 5/907; H04N 2101/00; H04N 5/77
(Continued)

(56) References Cited

U.S. PATENT DOCUMENTS

2011/0200299 A1 8/2011 Kitahara et al.
2012/0056898 A1* 3/2012 Tsurumi ................ G06T 11/60
345/633

FOREIGN PATENT DOCUMENTS

JP 2011-187001 A 9/2011
JP 2012-058838 A 3/2012
WO 2010055624 A1 5/2010

OTHER PUBLICATIONS

International Search Report corresponding to PCT/JP2013/061997, dated Aug. 6, 2013, 1 pg.

* cited by examiner

Primary Examiner — William C. Vaughn, Jr.
Assistant Examiner — Daniel Tekle
(74) Attorney, Agent, or Firm — Chip Law Group

(57) ABSTRACT

There is provided an information processing device including a data processing section configured to perform processing of playing back content according to a feature image, based on detection of the feature image from a captured image acquired by a capturing of an imaging section, and a specifying section configured to specify a resume point, which is a position of playing back the content, according to a timing at which the detection of the feature image is impossible. The data processing section performs the playback of the content from a position corresponding to the resume point, according to re-detection of the feature image after the detection of the feature image becomes impossible.

15 Claims, 12 Drawing Sheets

(51) Int. Cl.
*H04N 5/76* (2006.01)
*H04N 9/82* (2006.01)
*H04N 21/472* (2011.01)
*H04N 5/765* (2006.01)
*G06T 19/00* (2011.01)
*G11B 27/22* (2006.01)
*G11B 31/00* (2006.01)

(52) U.S. Cl.
CPC ............. *G11B 31/006* (2013.01); *H04N 5/76* (2013.01); *H04N 5/765* (2013.01); *H04N 9/8205* (2013.01); *H04N 21/47217* (2013.01)

(58) Field of Classification Search
USPC ........................................................ 386/224
See application file for complete search history.

FIG. 9
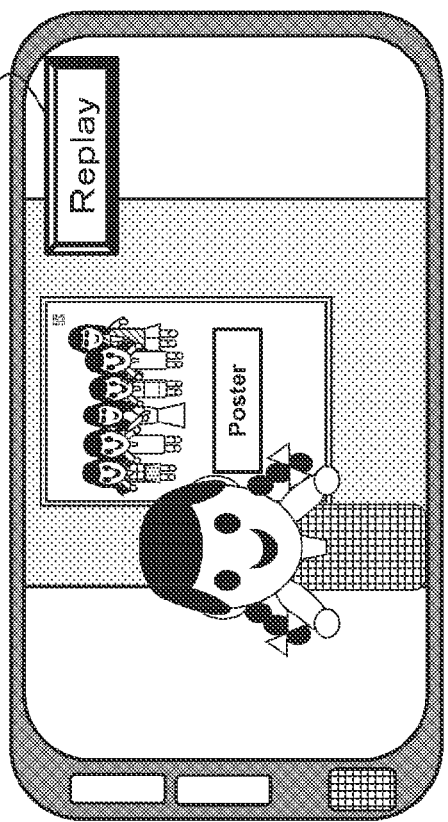
(A)
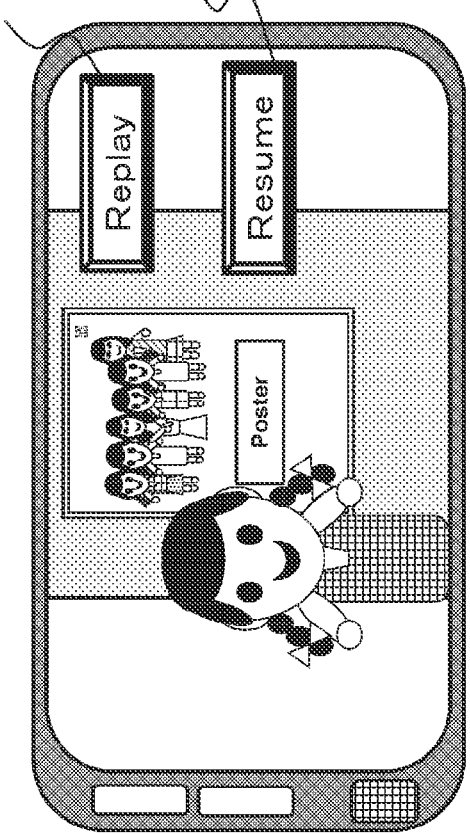
(B)
251 ICON OF INSTRUCTING PLAYBACK FROM BEGINNING
252 ICON OF INSTRUCTING PLAYBACK FROM STOP POSITION

INFORMATION PROCESSING DEVICE, INFORMATION PROCESSING METHOD, AND PROGRAM

CROSS-REFERENCE TO RELATED APPLICATION

The present application is a national phase entry under 35 U.S.C. §371 of International Application No. PCT/JP2013/061997 filed Apr. 24, 2013, published on Dec. 19, 2013 as WO 2013/187131 A1, which claims priority from Japanese Patent Application No. JP 2012-133321 filed in the Japanese Patent Office on Jun. 12, 2012.

TECHNICAL FIELD

The present disclosure relates to an information processing device, an information processing method, and a program. In particular, the present disclosure relates to an information processing device, an information processing method, and a program, which perform an augmented reality (AR) display.

BACKGROUND ART

For example, an image, in which a virtual image other than a captured image is superimposed on a captured image of a camera, is called an augmented reality (AR) image and has recently been used in various fields.

In particular, in recent years, portable terminals, such as a smartphone having a camera function and a display as well as a communication function, have been widespread, and applications that apply an AR image to such a smartphone are widely used.

As one example of use of an AR image, there is the following example.

When a certain object is captured by using, for example, a camera function of a portable terminal such as a smartphone, object information, for example, a marker such as a cyber-code printed on the captured object, is identified, a virtual image such as a character or a person selected based on the identified marker is superimposedly displayed on the captured image, and a sound is output as if the virtual image speaks.

There are various virtual images, for example, an image of a virtual character related to a captured image, or a pre-captured person or landscape. Information on a virtual image or a sound output to the portable terminal is acquired from a storage section of the portable terminal or a server connected to the portable terminal through a network.

Also, as an example of related art that discloses the processing of generating and displaying an AR image, there is Patent Literature 1 (JP 2012-58838A).

However, the output of the virtual image or the sound is started with the recognition of the marker from the captured image as a trigger. Therefore, for example, when a user changes the direction of the imaging section (camera) of the portable terminal and thus the marker is deviated from the captured image, the output of the virtual image or sound is stopped.

When the user changes again the direction of the imaging section (camera) and thus the marker is put in the captured image, the output of the same virtual image or sound is played back from the beginning.

That is, the playback and stop of the virtual image are controlled by the following two processes.

(Processing 1) Starting the playback of the virtual image and the sound by the recognition of the marker from the captured image (Processing 2) Ending the playback of the virtual image and the sound by the marker-lost from the captured image For example, with regard to information in which content to be played back by marker recognition is made up of an about 30-second image and sound, a user will have to maintain a marker capturing state for 30 seconds, without moving a portable terminal, so as to view the whole 30-second content.

For example, if the marker is deviated from the captured image even once in 30 seconds, the playback of the content made up of the virtual image and sound is stopped on the way. Once again, if moving to the marker capturing position, the playback cannot be resumed from the stopped position and the playback is executed again from the start position of the content.

In such a situation, an example such as a place that is crowded with people coming and going, for example, a configuration that provides information to a user by setting a marker to a street advertisement, may make it difficult to transfer information to the user. That is, at a place that is crowded with people coming and going, a movement of a person is included in a captured image and it is difficult to allow a camera to continuously capture a marker. As a result, that occurs a problem that the playback is repeatedly executed from the start point of the content and it is difficult to play back the content to the end.

CITATION LIST

Patent Literature

Patent Literature 1: JP 2012-58838A

SUMMARY OF INVENTION

Technical Problem

The present disclosure has been made in view of, for example, the above problems, and provides an information processing device, an information processing method, and a program. According to the present disclosure, in a configuration that recognizes a feature image such as a marker within a captured image and performs the playback of content, a content playback control can be performed according to various situations, such as a case where the marker is deviated from the captured image or a case where the marker is re-recognized.

According to a first aspect of the present disclosure, there is provided an information processing device including:

a data processing section configured to perform processing of playing back content according to a feature image, based on detection of the feature image from a captured image acquired by a capturing of an imaging section; and a specifying section configured to specify a resume point, which is a position of playing back the content, according to a timing at which the detection of the feature image is impossible, wherein the data processing section performs the playback of the content from a position corresponding to the resume point, according to re-detection of the feature image after the detection of the feature image becomes impossible.

According to an embodiment of the present disclosure, there is provided a the data processing section performs processing of superimposedly displaying image data constituting the content on the captured image of the imaging section in the content playback processing.

According to an embodiment of the present disclosure, the content is content that includes an image and a sound. When the detection of the feature image becomes impossible, the data processing section stops the playback of only the image and continuously plays back the sound.

According to an embodiment of the present disclosure, the data processing section measures a time elapsed from a time when the detection of the feature image becomes impossible, and stops the playback of the sound when the elapsed time exceeds a preset threshold time.

According to an embodiment of the present disclosure, the data processing section acquires the resume point from memory, with the re-detection of the feature image as a condition, and performs the playback of the content including the image and the sound from an acquired content position.

According to an embodiment of the present disclosure, when the detection of the feature image becomes impossible, the data processing section performs fade-out processing of lowering a content output level with the passage of time.

According to an embodiment of the present disclosure, upon the re-detection of the feature image, the data processing section performs fade-in processing of increasing a content output level with the passage of time.

According to an embodiment of the present disclosure, the data processing section inputs instruction information of selecting either of (a) resume processing of playing back the content from the resume point stored in memory or (b) replay processing of playing back the content from beginning, as an aspect of the content playback processing upon the re-detection of the feature image, and performs the playback of the content according to input information.

According to an embodiment of the present disclosure, the data processing section displays, on a display section, a user interface allowing input of instruction information of selecting either of (a) resume processing of playing back the content from the resume point stored in memory or (b) replay processing of playing back the content from beginning, as an aspect of the content playback processing upon the re-detection of the feature image.

According to an embodiment of the present disclosure, the feature image is an identification mark included in the captured image.

According to an embodiment of the present disclosure, the data processing section perform processing of stopping the playback of the content according to input of scene information of the playback content, or sensor information of the information processing device, or incoming call information of the information processing device, and recording a content position at which the playback is stopped in memory.

According to a second aspect of the present disclosure, there is provided an information processing device including:

an imaging section configured to capture an image;

a communication section configured to perform communication with a server; and a data processing section configured to perform detection of a feature image from a captured image of the imaging section and perform playback of content provided from the server, wherein, when the detection of the feature image from the captured image becomes impossible, the data processing section stops the playback of the content received from the server and transmits a playback stop position to the server as resume point information, and inputs the resume point information from the server, with a subsequent re-detection of the feature image as a condition, and performs the playback of the content from the resume point position.

According to a third aspect of the present disclosure, there is provided an information processing device including:

an imaging section configured to capture an image;

a communication section configured to perform communication with a server; and a data processing section configured to transmit a captured image of the imaging section to the server through the communication section, receive feature image detection information from the server, based on the captured image, and performs the playback of the content provided from the server, wherein, when the feature image detection information from the server indicates that the detection of the feature image is impossible, the data processing section stops the playback of the content, transmits a content position, at which the playback is stopped, to the server through the communication section as resume point information, receives the content from a position corresponding to the resume point position from the server, with a subsequent re-detection of the feature image as a condition, and plays back the received content.

According to a fourth aspect of the present disclosure, there is provided a server including:

a communication section configured to perform communication with a client;

a storage section configured to store content to be provided to the client; and a data processing section configured to perform processing of detecting a feature image from a captured image of the client and processing of providing content, wherein the data processing section performs the processing of detecting the feature image from the captured image of the client and provides feature image detection information to the client.

According to a fifth aspect of the present disclosure, there is provided an information processing method, which is performed by an information processing device, the information processing method comprising:

performing, by a data processing section, processing of playing back content according to a feature image, based on detection of the feature image from a captured image acquired by a capturing of an imaging section, wherein the data processing section performs processing of specifying a resume point, which is a playback position of the content, according to a timing at which the detection of the feature image is impossible, and processing of playing back the content from a position corresponding to the resume point, according to re-detection of the feature image after the detection of the feature image becomes impossible.

According to a sixth aspect of the present disclosure, there is provided a program for causing an information processing device to execute information processing of:

causing a data processing section to perform processing of playing back content according to a feature image, based on detection of the feature image from a captured image acquired by a capturing of an imaging section, wherein the program causes the data processing section to perform
    processing of specifying a resume point, which is a playback position of the content, according to a timing at which the detection of the feature image is impossible, and
    processing of playing back the content from a position corresponding to the resume point, according to re-detection of the feature image after the detection of the feature image becomes impossible.

Solution to Problem

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to the configuration of one embodiment of the present disclosure, the improved playback control is realized at the time of the marker-lost and upon the marker re-detection in the content playback processing according to the feature image such as the marker.

Specifically, the feature image such as the marker is detected from the captured image of the imaging section, and the content is played back according to the marker detection. At the time of the marker-lost in which the marker detection from the captured image is impossible, the playback of the content is stopped, the content playback stop position is recorded in the memory, the content position is acquired from the memory, with a subsequent marker re-detection as a condition, and the content is played back from the acquired content position. The content is content that includes an image and a sound. The playback of only the image is stopped at the time of the marker-lost and the playback of the sound is continued. When the time elapsed from the time of the marker-lost time exceeds the preset threshold time, the playback of the sound is stopped.

According to these configurations, the improved playback control is realized at the time of the marker-lost and the marker re-detection in the content playback processing according to the marker.

BRIEF DESCRIPTION OF DRAWINGS

FIG. 9 is a diagram describing an example of a user interface (UI) displayed on a display section of the information processing device of the present disclosure.

DESCRIPTION OF EMBODIMENTS

Hereinafter, an information processing device, an information processing method, and a program according to the present disclosure will be described in detail with reference to the appended drawings. Note that description will be provided in the following order.

1. Overview of Processing of Present Disclosure
2. State Transition in Content Playback Control of Present Disclosure
3. Content Playback Control Processing Sequence Performed by Information Processing Device
4. Configuration Example of Information Processing Device
5. Other Embodiments
6. Summary of Configuration of Present Disclosure 1. Overview of Processing of Present Disclosure First, the overview of processing of the present disclosure is described with reference to FIG. 1 below.

Figure 1:
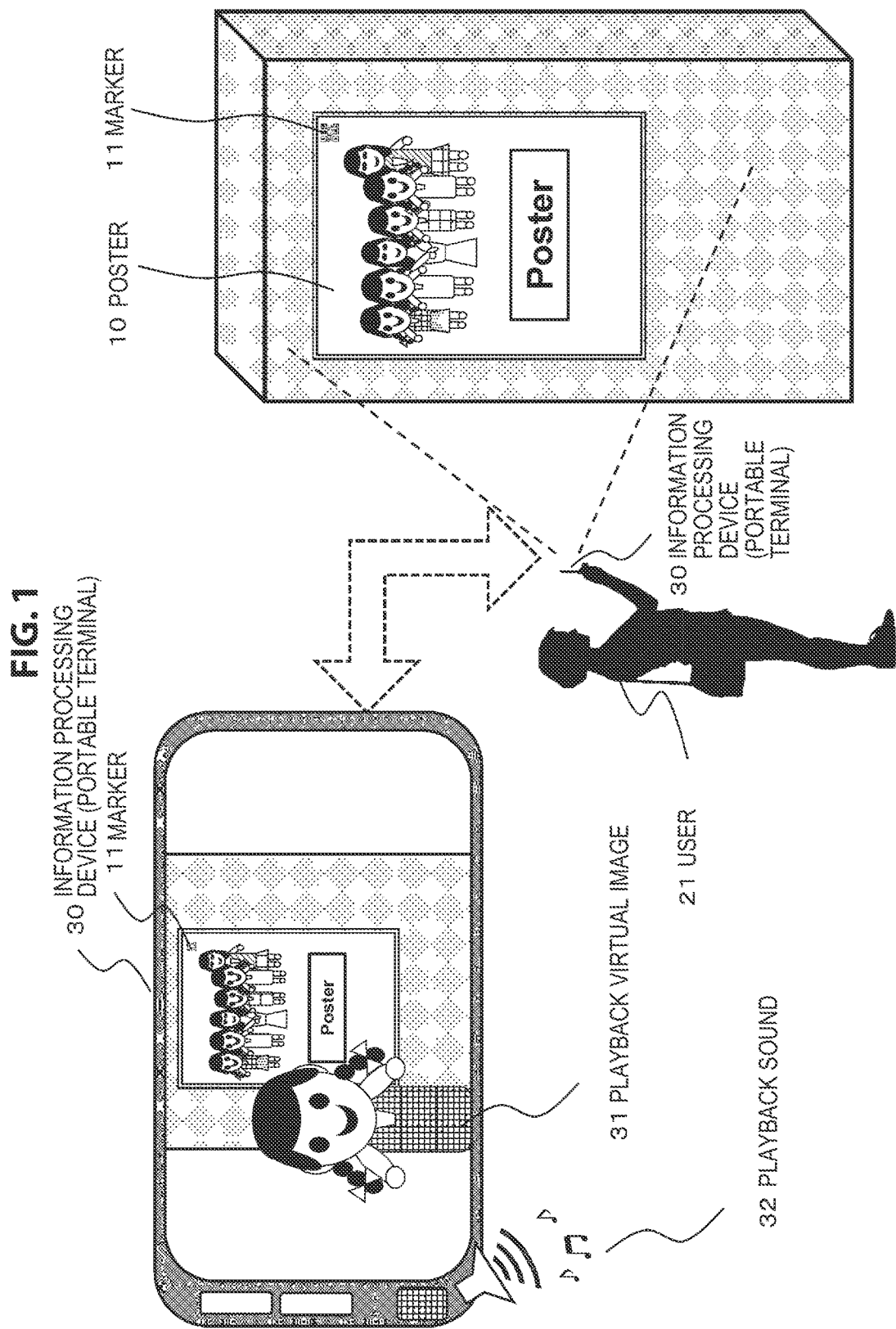
FIG. 1 is a diagram describing an overview of processing of the present disclosure.

FIG. 1 is a diagram illustrating one example of use of processing of the present disclosure. A user 21 captures an image, including a poster 10, by using an information processing device (portable terminal) 30 such as a smartphone with a camera function. Incidentally, the captured image is, for example, a moving image.

For example, a marker (identifier) such as a cyber-code (two-dimensional code) is printed on the poster 10.

In the following embodiment, an example in which the marker (identifier) such as the cyber-code (two-dimensional code) is a subject to be identified is described. However, in the configuration of the present disclosure, various feature images, for example, the following feature images, can be a subject to be identified.

Two-dimensional bar code (cyber-code)
    Subject to particular object recognition such as a face of a particular person or a particular object (book cover)
    Subject of general object recognition such as a vehicle, a pen, or a dog The information processing device 30 transmits capturing information, including marker information, to a server through a communication section. The server recognizes that the information processing device (client) 30 captures the image including the poster 10, based on the capturing information received from the information processing device (client) 30, acquires content stored in a content database inside the server, for example, content made up of a sound and a moving image generated by capturing a person printed on the poster 10, and transmits the acquired content to the information processing device 30.

The information processing device 30 plays back the content received from the server. The image is superimposedly displayed on the image that is being captured. A playback virtual image 31 is illustrated in FIG. 1. Furthermore, a sound is output through a speaker. A playback sound 32 is illustrated in FIG. 1.

As illustrated in FIG. 1, the information processing device 30 displays the captured image actually captured by the imaging section (camera) of the information processing device 30 together with the virtual image received from the server. Such an image is referred to as an augmented reality (AR) image.

Furthermore, sound information received from the server is output in conjunction with the playback of the virtual image.

The playback virtual image 31 displayed on the information processing device 30 is an image of a person who does not actually exist in a place where the user is located.

However, on the screen of the display section of the information processing device 30, the virtual image is displayed as if the person stands in the place where the user 21 is located.

The information processing device 30 can record the content including the virtual image 31 and the sound.

In the above description, the processing example of providing the content made up of the virtual image and the sound from the server has been described, but it may be configured such that the content is stored in the storage section of the information processing device 30 and the content acquired by seeking marker-based content is played back, based on the captured identifier (marker).

When the marker 11 is recognized from the captured image of the information processing device 30, the information processing device 30 starts playing back the content.

However, as described above, in many devices that performs the playback of the content with the marker recognition as a trigger, it is general that the playback of the content is stopped when the marker is not recognized, and thereafter, the same content is played back from the beginning when the marker is recognized again.

In the configuration of the present disclosure, the processing control in such a case is performed differently from the processing of the related art. One example will be described with reference to FIG. 2.

Figure 2:
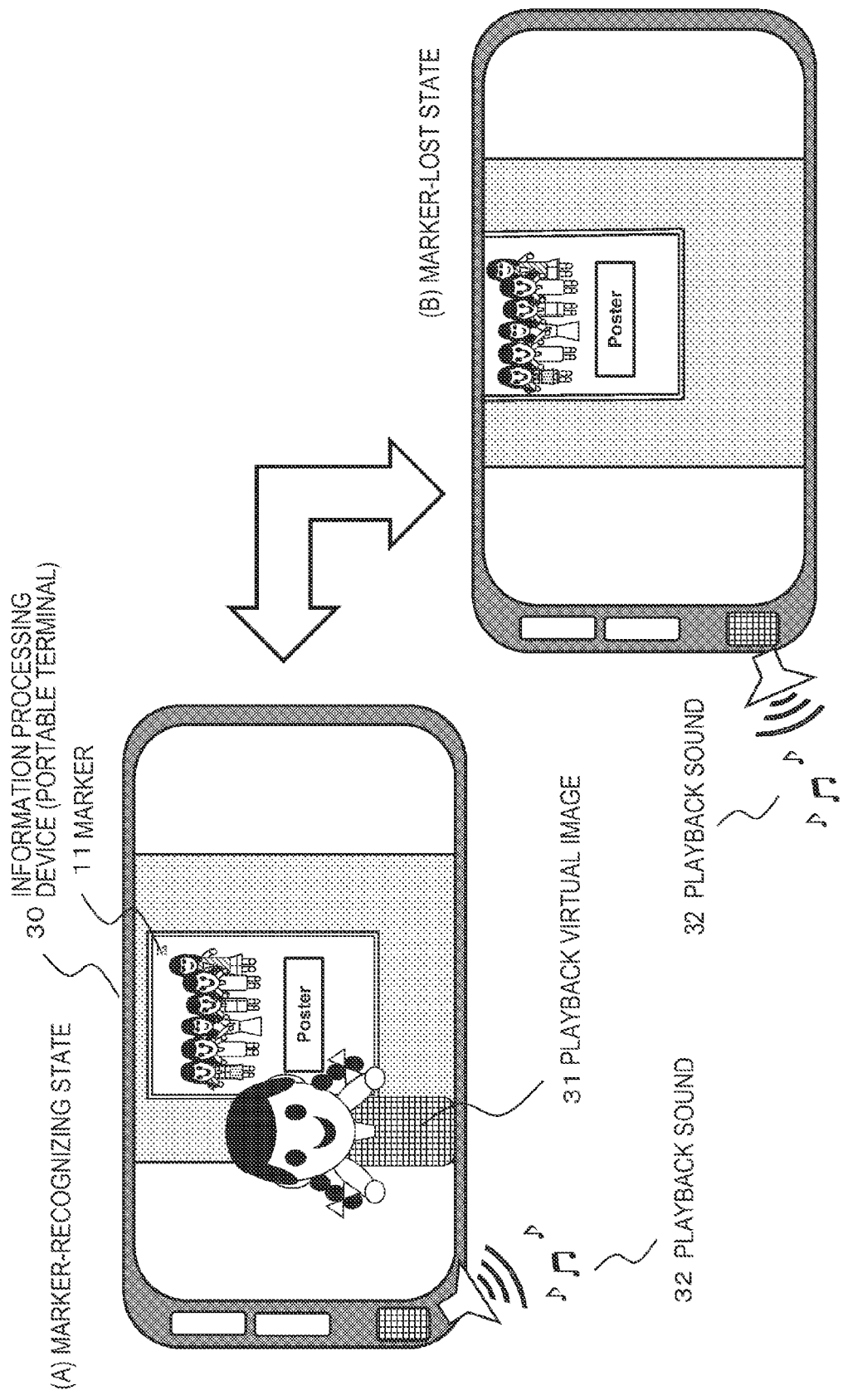
FIG. 2 is a diagram describing an overview of processing of the present disclosure.

As a state of capturing an image in the information processing device 30 held by the user, two states are illustrated in FIG. 2.

(A) Marker-recognizing state
(B) Marker-temporarily-lost state (A) The marker-recognizing state is a state in which the marker 11 is picked up in the captured image that is captured by the imaging section (camera) of the information processing device 30 held by the user, and the marker recognition is possible.

In this state, content difference is performed based on the marker recognition, the playback virtual picture image 31 is displayed on the display section, and the playback sound 32 is output from the speaker.

On the other hand, (B) the marker-temporarily-lost state is a state in which the marker 11 is lost from the captured image that is captured by the imaging section (camera) of the information processing device 30 held by the user, and the marker recognition is temporarily impossible.

In the processing of the present disclosure, the playback of the sound is continued even in the marker-temporarily-lost state.

Due to such a content playback control, even when the marker disappears instantaneously from the captured image, the user will not miss listening to content such as advertisement information.

Also, in the configuration of the present disclosure, in the case of returning to the state in which the marker recognition is possible, that is, the state of FIG. 2(A), the continuous playback processing is continued, instead of performing the playback from the beginning of the content.

Hereinafter, the content playback control processing of the present disclosure will be described in detail.

2. State Transition in Content Playback Control of Present Disclosure

Next, the state transition in the content playback control of the present disclosure will be described.

Figure 3:
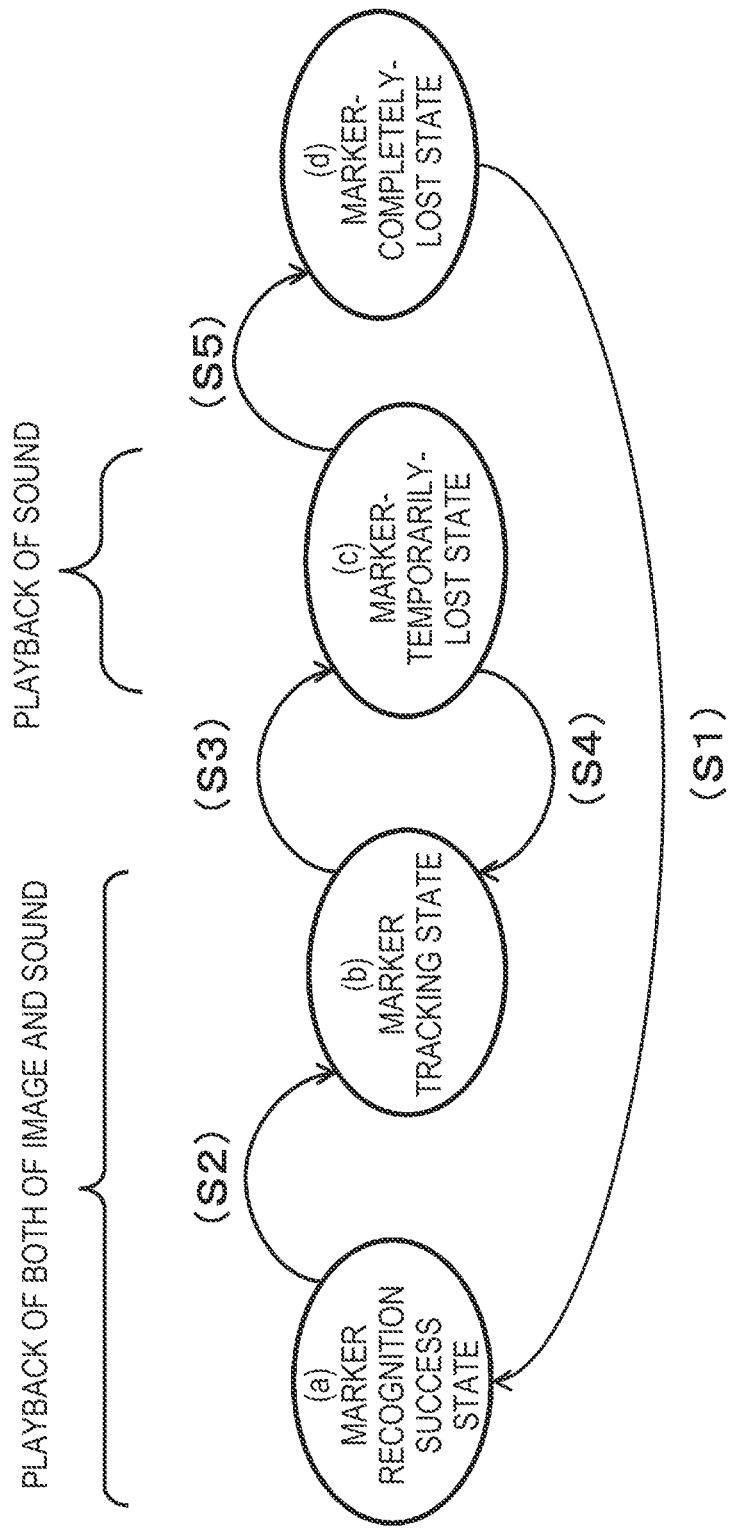
FIG. 3 is a diagram describing a state transition example of an information processing device of the present disclosure.

FIG. 3 is a diagram describing a plurality of states, to which is the information processing device of the present disclosure is set, and transition processing of each state.

The information processing device of the present disclosure is set to any one of the following four states.

(a) Marker recognition success state
(b) Marker tracking state
(c) Marker-temporarily-lost state
(d) Marker-completely-lost state The information processing device of the present disclosure is set to any one of the four states (a) to (d).

(a) The marker recognition success state is a state in which the marker is recognized for the first time from a "completely lost state" in which the marker cannot be recognized from the captured image.

(b) The marker tracking state is a state in which the recognized marker is being tracked.

(c) The marker-temporarily-lost state is a state in which the marker tracked in the "marker tracking state" is lost and the time elapsed from the lost time is less than or equal to a preset threshold time Δt.

(d) The marker-completely-lost state is a state in which the marker tracked in the "marker tracking state" is lost and the time elapsed from the lost time exceeds the preset threshold time Δt.

When an application being a program executing the processing of the present disclosure is started, first, an initial state is set to the "(d) marker-completely-lost state". After that, when the marker is recognized from the captured image, the state transitions to the "(a) marker recognition success state" according to a transition line (S1) illustrated in FIG. 3.

Immediately after the transition to the "(a) marker recognition success state", the state transitions to the "(b) marker tracking state" according to a transition line (S2).

While the marker is being detected from the captured image in the "(b) marker tracking state", the state remains in the "(b) marker tracking state".

In the "(b) marker tracking state", when the marker is lost from the captured image, the state transitions to the "(c) marker-temporarily-lost state" according to a transition line (S3).

In the "(c) marker-temporarily-lost state", a time elapsed from a start time of this state is measured, and it is determined whether the measured time exceeds the preset threshold time Δt.

In the "(c) marker-temporarily-lost state", when the marker is detected from the captured image within the preset threshold time Δt, the state transitions to the "(b) marker tracking state" according to a transition line (S4).

On the other hand, in the "(c) marker-temporarily-lost state", when the marker is not detected from the captured image within the preset threshold time Δt and the measured time exceeds the preset threshold time Δt, the state transitions to the "(d) marker-completely-lost state" according to a transition line (S5).

In the "(d) marker-completely-lost state", when the marker is recognized from the captured image, the state transitions to the "(a) marker recognition success state" according to the transition line (S1) illustrated in FIG. 3.

In the "(d) marker-completely-lost state", when the marker is not recognized from the captured image, the state maintains the "(d) marker-completely-lost state".

The information processing device of the present disclosure performs these state transitions.

Furthermore, as illustrated in FIG. 3, (a) Marker recognition success state (b) Marker tracking state In these two states, the playback of the content made up of the image and the sound is performed.

That is, as in the marker recognition state illustrated in FIG. 2(A), the playback virtual image 31 is displayed on the display section of the information processing device 30 while being superimposed on the captured image, and outputs the playback sound 32 through the speaker.

Also, in the (c) marker-temporarily-lost state, the playback of only the sound is performed.

That is, as in the marker-temporarily-lost state illustrated in FIG. 2(B), the playback sound 32 is output through the speaker of the information processing device 30. The playback virtual image 31 is not superimposedly displayed on the display section.

Also, in the (d) marker-completely-lost state, the playback of the image and the sound is stopped.

3. Content Playback Control Processing Sequence Performed by Information Processing Device Next, the content playback control processing sequence that is performed by the information processing device of the present disclosure will be described.

Figure 4:
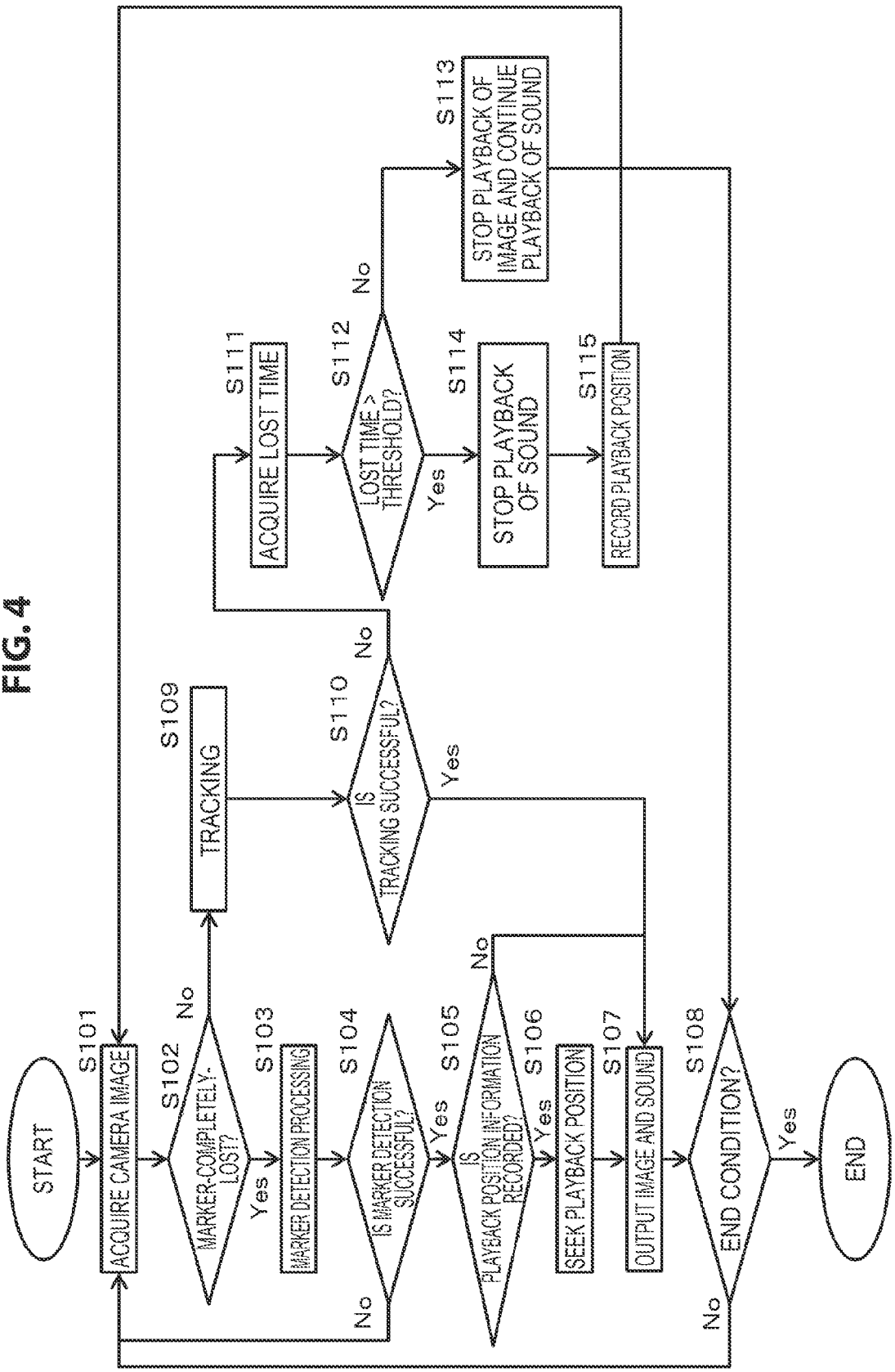
FIG. 4 is a diagram illustrating a flowchart describing a content playback control sequence that is performed by the information processing device of the present disclosure.

FIG. 4 is a diagram illustrating a flowchart describing the content playback control sequence that is performed by the information processing device of the present disclosure.

Incidentally, the processing illustrated in the flow of FIG. 4 is performed under the control of a data processing section of the information processing device, that is, a data processing section having a CPU or the like with a program execution function, according to, for example, the program (application) stored in the storage section of the information processing device.

Hereinafter, details of the processing of the respective steps will be sequentially described.

(Step S101)

First, the information processing device starts the application and captures an image through the imaging section (camera) of the information processing device in step S101. For example, the poster with the marker as illustrated in FIG. 1 is captured.

After starting the augmented capture, the data processing section of the information processing device continuously performs marker seek processing of determining whether the marker is included in the captured image.

As described above, the initial state of the information processing device is the "marker-completely-lost state" and transitions to the "marker recognition success state" when the marker is detected from the captured image.

Also, for example, as described with reference to FIG. 1, code information such as a cyber-code can be applied as the marker. Also, instead of using such code information, for example, image information of the poster itself can be used as the marker, or a variety of information such as the number printed on the poster can be used as the marker.

(Step S102)

Subsequently, in step S102, it is determined whether the state is the "marker-completely-lost state" in which the marker is not detected from the captured image.

As described above, the initial state is the "marker-completely-lost state".

When it is determined as being in the "marker-completely-lost state", the processing proceeds to step S103.

When the state is not the "marker-completely-lost state", that is, when the marker has already been detected, the processing proceeds to step S109 and marker tracking processing is performed. That is, the marker tracking processing in the marker tracking state illustrated in FIG. 3(b) is performed.

(Step S103)

In step S102, it is determined as being in the "marker-completely-lost state", the processing proceeds to step S103, and processing of detecting the marker from the captured image is performed.

(Step S104)

In step S104, it is determined whether the marker detection processing of step S103 is successful.

When the marker detection processing is successful, the state transitions to the "marker recognition success state" and the processing proceeds to step S105.

On the other hand, when the marker detection processing is not successful, the processing returns to the camera image acquisition processing of step S101 and repeats the processing of step S101 and subsequent steps.

(Step S105)

When the marker detection processing is successful in step S104, the state transitions to the "marker recognition success state" and the processing proceeds to step S105.

In step S105, it is determined whether playback position information is recorded in the memory (storage section) of the information processing device.

The playback position information is playback stop position information in the previous content playback processing.

Also, the storage destination of the playback position information may be the memory (storage section) of the information processing device, or may be the storage section inside the server that performs communication through the communication section of the information processing device. In the configuration using the server, the flow illustrated in FIG. 4 is performed while the processing of communicating with the server is being performed.

Although described below, when the content playback is stopped in the middle of playing back the content the information processing device, based on a predetermined condition such as marker-lost, the information processing device records the content playback stop position in the memory (storage section) of the information processing device or the server.

In the following description, a configuration example that does not use the server will be described.

In step S105, the content playback is stopped in the middle and it is determined whether the playback position information is recorded in the memory (storage section) of the information processing device.

When the playback position information is recorded, the processing proceeds to step S106.

When the playback position information is not recorded, the processing proceeds to step S107.

(Step S106)

In step S106, when it is determined in step S105 that the playback stop position information in the previous content playback processing is recorded in the memory (storage section) of the information processing device, the information processing device acquires the playback stop position information from the memory and performs playback position seek processing of seeking the playback start position, with the acquired content playback stop position as the content playback start position.

(Step S107)

In step S107, the information processing device starts the playback of the content from the content playback start position detected by the seek processing of step S106.

Also, when it is determined in step S105 that the playback stop position information is not recorded in the memory (storage section) of the information processing device in the previous content playback processing, the playback of the content is started from the start part of the content in step S107.

Incidentally, the playback content is content made up of the playback virtual image 31 and the playback sound 32, which are described with reference to FIG. 1. The content is acquired from the storage section of the information processing device. Alternatively, in the configuration using the server, the content may be acquired from the server that is in communication.

In the following description, a processing example of playing back the content stored in the storage section of the information processing device is described.

(Step S108)

In step S108, it is determined whether a predetermined end condition, such as a content playback end or an application end, occurs, and the processing is ended when the end condition occurs.

When the end condition does not occur, the processing returns to step S101 and continuously performs the processing of step S101 and subsequent steps.

(Step S109)

As described above, step S109 is a transition processing step when the state is not the "marker-completely-lost state", that is, when the marker has already been detected, in the processing of step S102, that is, the processing of determining whether the state is the "marker-completely-lost state" in which the marker is not detected from the captured image.

In step S109, the tracking of the detected marker is performed. That is, the marker tracking processing in the marker tracking state illustrated in FIG. 3(b) is performed.

(Step S110)

In step S110, it is determined whether the tracking of the marker is successful in the marker tracking.

When successful, the processing proceeds to step S107 to continue the playback of the content.

When the tracking of the marker is failed in the marker tracking, that is, when the marker is lost, the processing proceeds to step S111. In this case, the state transitions to the "(c) marker-temporarily-lost state" illustrated in FIG. 3.

(Step S111)

In step S111, a time elapsed from the marker-lost time starts to be measured.

(Step S112)

In step S112, it is determined whether the time (lost time) elapsed from the occurrence of the marker-lost, which starts to be measured in step S111, exceeds the preset threshold time Δt.

Lost time>Threshold time Δt

When satisfying the above determination formula, the processing proceeds to step S114. At the time of proceeding to step S114, the state transitions to the "(d) marker-completely-lost state" illustrated in FIG. 3.

When the time (lost time) elapsed from the occurrence of the marker-lost does not exceed the preset threshold time Δt and the above determination formula is not satisfied, the processing proceeds to step S113.

(Step S113)

Step S113 is processing when the time (lost time) elapsed from the occurrence of the marker-lost does not exceed the preset threshold time Δt. That is, step S113 is processing in the "(c) marker-temporarily-lost state" illustrated in FIG. 3. In step S113, the playback of the image in the content is stopped, that is, the processing of superimposedly displaying the virtual image on the captured image is stopped. However, only the output of the sound is continued.

Specifically, the content playback of only the sound corresponding to the marker-temporarily-lost state illustrated in FIG. 2(B) is continued.

(Step S114)

Step S114 is processing when the time (lost time) elapsed from the occurrence of the marker-lost exceeds the preset threshold time Δt. That is, step S114 is processing in the case of transitioning to the "(d) marker-completely-lost state" illustrated in FIG. 3.

In step S114, the playback of both of the image and the sound is stopped. That is, both of the processing of superimposedly displaying the virtual image on the captured image and the playback of the sound are stopped.

(Step S115)

After the playback of the content is stopped in step S114, content playback stop position information is recorded in the memory in step S115.

Also, in the content, the playback of the image is stopped in advance, only the sound is continuously played back, and after that, the processing of stopping the playback of the sound is performed. However, the playback stop position stored in the memory is the setting of either the image playback stop position or the sound playback stop position.

The image and the sound of the content are synchronously played back. In step S113, only the sound of the playback content is output, and the displaying of the image is not performed. However, the content playback position is updated according to the playback of the sound.

In step S115, playback position information corresponding to the image playback stop position or the sound playback stop position in step S114 is recorded in the memory.

The processing of seeking the playback position information from the memory in step S105 described above is processing of extracting the playback position information from the memory.

When the acquisition of the playback position information from the memory in step S105 is successful, the playback start position is determined in step S107, and the playback of the content is resumed in step S107, the image and the sound start to be played back together from the stop position of the image or the sound stopped in step S114.

The processing example of stopping the playback of the content and then resuming the playback of the content will be described with reference to a sequence diagram illustrated in FIG. 5.

The playback content is content made up of playback position=T0 to T5, with playback start position=T0 and playback end position=T5 as the content playback position. An image and a sound are included in the content.

The image corresponds to the playback virtual image 31 illustrated in FIGS. 1 and 2 and is an image that is superimposedly displayed on a base image such as the captured image.

The sound corresponds to, for example, the playback sound 32 that is synchronously played back together with the image as illustrated in FIGS. 1 and 2.

Figure 5:
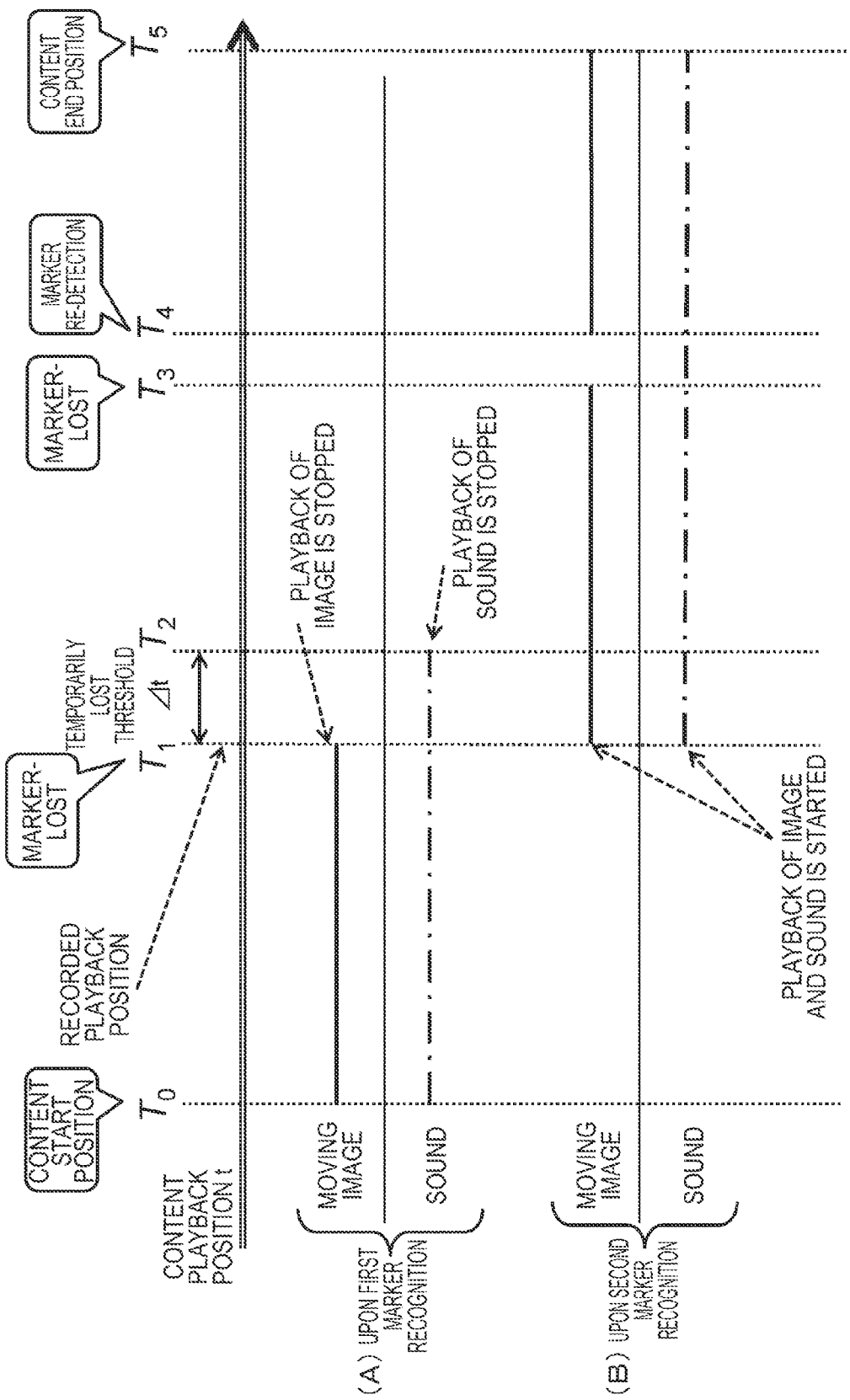
FIG. 5 is a diagram describing an example of the content playback control sequence that is performed by the information processing device of the present disclosure.

In FIG. 5,
(A) Playback processing upon first marker recognition
(B) Playback processing upon second marker recognition
these are separately illustrated.

First, (A) playback processing upon first marker recognition will be described. When the application is started and the marker is detected from the captured image, both of the image and the sound start to be played back from the content start position (T0).

At the time point of the content playback position (T1), the marker-lost occurs, that is, the marker detection from the captured image is failed.

From this time point, the measurement of the lost time is started. That is, the time elapsed from T1 illustrated in the drawing is measured.

Upon the occurrence of the marker-lost, the playback of the image in the content is stopped.

That is, the content playback time (T1) is the image playback stop position, and the image playback stop position is recorded in the memory.

Incidentally, in the present processing example, the image playback stop position is the playback position information stored in the memory.

The playback of the image is stopped at the content playback position (T1), but the playback of the sound is continuously performed. That is, only the playback of the sound is continuously performed in the "(c) marker-temporarily-lost state" illustrated in FIG. 3.

The sound playback processing corresponds to the processing of playing back only the sound at the content playback position (T1 to T2) illustrated in FIG. 5.

At the content playback position (T1), when the marker-lost occurs, the measurement of the lost time is started, and the marker-lost state is continued until the elapsed time has passed the preset threshold time Δt, the state transitions to the marker-completely-lost state and the playback of the sound is stopped at this time point. That is, as illustrated in FIG. 5, the playback of the sound is stopped at the content playback position (T2).

After that, when the marker detection processing is continuously performed from the captured image and the marker detection is successful, the playback processing upon the second marker recognition illustrated in FIG. 5(B) is performed.

In the (B) content playback processing upon the second marker recognition, the playback is performed from the stop position of the first playback processing.

(A) In the playback of the content upon the first marker recognition, the content playback time (T1) is the image playback stop position, and the image playback stop position is recorded in the memory.

(B) In the content playback processing upon the second marker recognition, the playback position information (T1) stored in the memory is acquired, and the playback of the image and the sound is started from the content playback position (T1).

Through this processing, the user can view the content from the playback stop position, instead of the beginning.

Furthermore, FIG. 5 illustrates processing when the marker-lost occurs at the content playback position (T3) in the (B) content playback processing upon the second marker recognition.

However, the example of the content playback position (T3 to T4) illustrated in the drawing is a processing example when the marker is re-detected before the time elapsed from the occurrence of the marker-lost exceeds the preset threshold time Δt.

That is, it is processing when the marker is re-detected at the time point of the content playback position (T4) before the time elapsed from the occurrence of the marker-lost exceeds the preset threshold time Δt.

In this case, the state transition is as follows.
Before T3, the state transitions to the marker tracking state.
At T3 to T4, the state transitions to the marker-temporarily-lost state.
At T4, the state transitions to the marker recognition success state.
After T4, the state transitions to the marker tracking state again.

At T3 when the marker-lost occurs, the playback of the image is stopped. However, the playback of the sound is continued.

After that, when the marker is re-detected at T4, the playback of the sound is continued as it is, and the playback of the image is also started from the playback position that is synchronized with the sound.

In the processing of the present disclosure, when the marker-lost occurs, since the playback stop position is recorded and the playback is started from the playback stop position at the time of resuming the layback, unnecessary processing of repeating the playback of the content from the beginning is not performed.

Also, even when the marker-lost occurs, the playback of the sound is continued for a predetermined time. Therefore, for example, the playback of the image is resumed in such a manner that the user performs processing of directing the camera to the marker position for that period, and thus, the continuous playback of the content can be performed.

Incidentally, in the content playback control processing illustrated in FIG. 5, the on/off switching of the playback of the content is performed at the time of stopping and resuming the playback of the content, but fade-out processing of gradually lowering the level of the sound may be performed at the time of stopping the playback of the content, and fade-in processing of gradually increasing the level of the sound may be performed at the time of resuming the playback of the content.

Figure 6:
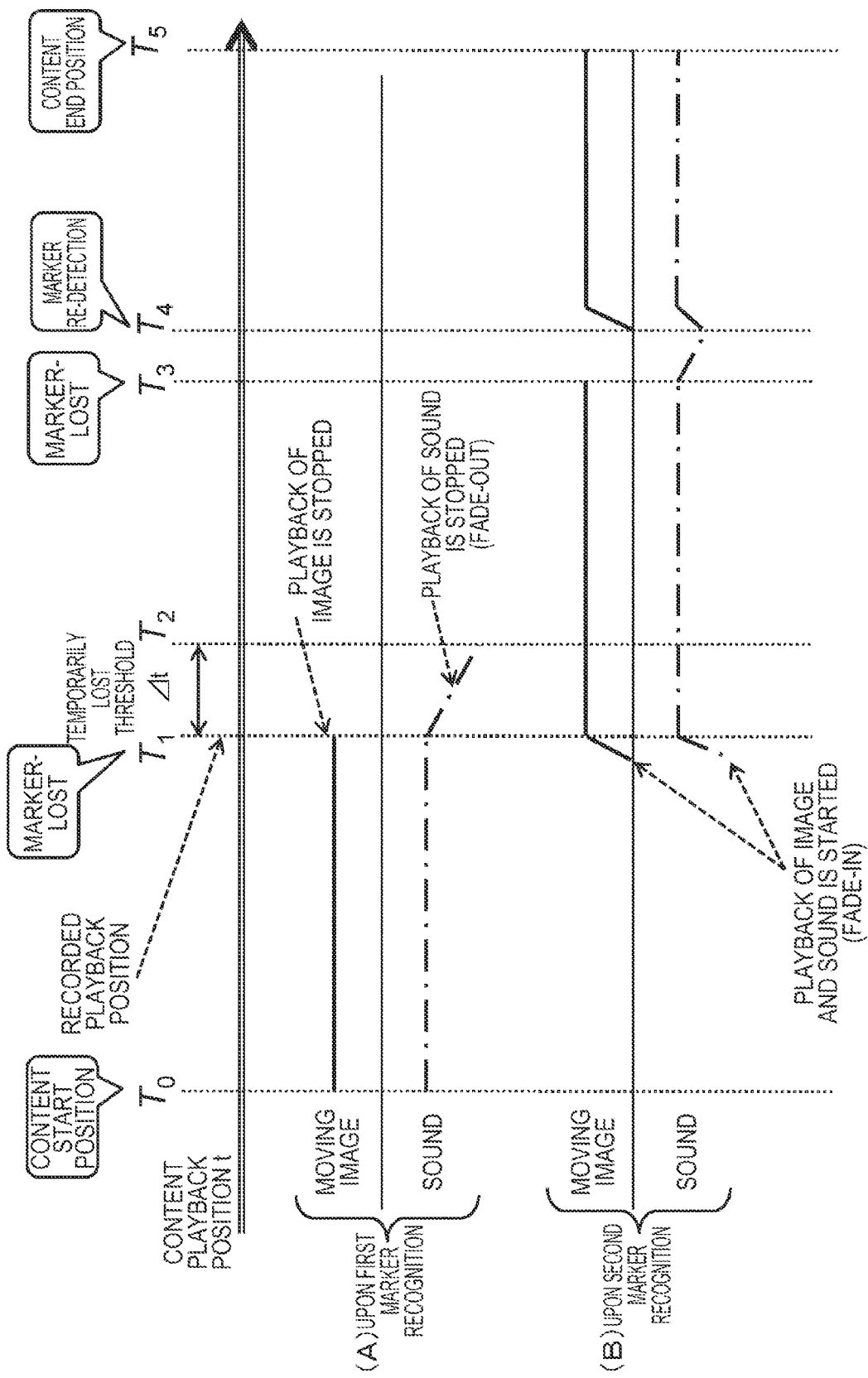
FIG. 6 is a diagram describing an example of the content playback control sequence that is performed by the information processing device of the present disclosure.

The playback control processing example is illustrated in FIG. 6.

In FIG. 6, similarly to FIG. 5

(A) Playback processing upon first marker recognition (B) Playback processing upon second marker recognition these are separately illustrated.

A timing of the playback content and the marker-lost or redetection is the same as that of FIG. 5.

That is, the content is content made up of playback position=T0 to T5. An image and a sound are included in the content.

(A) Processing shown in the playback processing upon the first marker recognition is processing when the marker-lost occurs at the playback position (T1) and, as it is, the threshold time (Δt) has elapsed.

In this processing example, at the time (T1) of the occurrence of the marker-lost, the playback of the image in the content is stopped and the image playback stop position is recorded in the memory.

The playback of the image is stopped at the content playback position (T1), but the playback of the sound is continuously performed. However, in the present processing example, in the processing of playing back the sound from the content playback position (T1), fade-out processing of gradually lowering the level of the sound is performed.

The fade-out sound playback processing is performed at the time of the processing of playing back only the sound at the content playback position (T1 to T2) illustrated in FIG. 6(A).

After that, when the marker detection processing is continuously performed from the captured image and the marker detection is successful, the playback processing upon the second marker recognition illustrated in FIG. 6(B) is performed.

(B) In the content playback processing upon the second marker recognition, the playback is performed from the stop position of the first playback processing.

(A) In the playback of the content upon the first marker recognition, the content playback time (T1) is the image playback stop position, and the image playback stop position is recorded in the memory.

(B) In the content playback processing upon the second marker recognition, the playback position information (T1) stored in the memory is acquired, and the playback of the image and the sound is resumed from the content playback position (T1).

In the present processing example, the position prior to the playback position information (T1) stored in the memory is set as the playback start position, and fade-in playback processing of gradually increasing the levels of the image and the sound from the playback start position is performed.

Furthermore, similarly to FIG. 5(B), FIG. 6(B) illustrates a processing example when the marker-lost occurs at the content playback position (T3) and the marker is re-detected before excess of the preset threshold time Δt.

When the marker-lost occurs at the content playback position (T3), the playback of the image is stopped, but the playback of the sound is not stopped but continued. However, in the present processing example, fade-out processing of gradually lowering the level of the playback sound is performed.

Furthermore, when the marker is re-detected at the time point of the content playback position (T4) before the time elapsed from the occurrence of the marker-lost exceeds the preset threshold time Δt, the playback is resumed by gradually increasing the playback levels of the image and the sound, that is, the playback of the content is resumed by performing the fade-in processing.

4. Configuration Example of Information Processing Device

Next, a configuration example of the information processing device, which performs the above-described processing, will be described with reference to FIG. 7.

Figure 7:
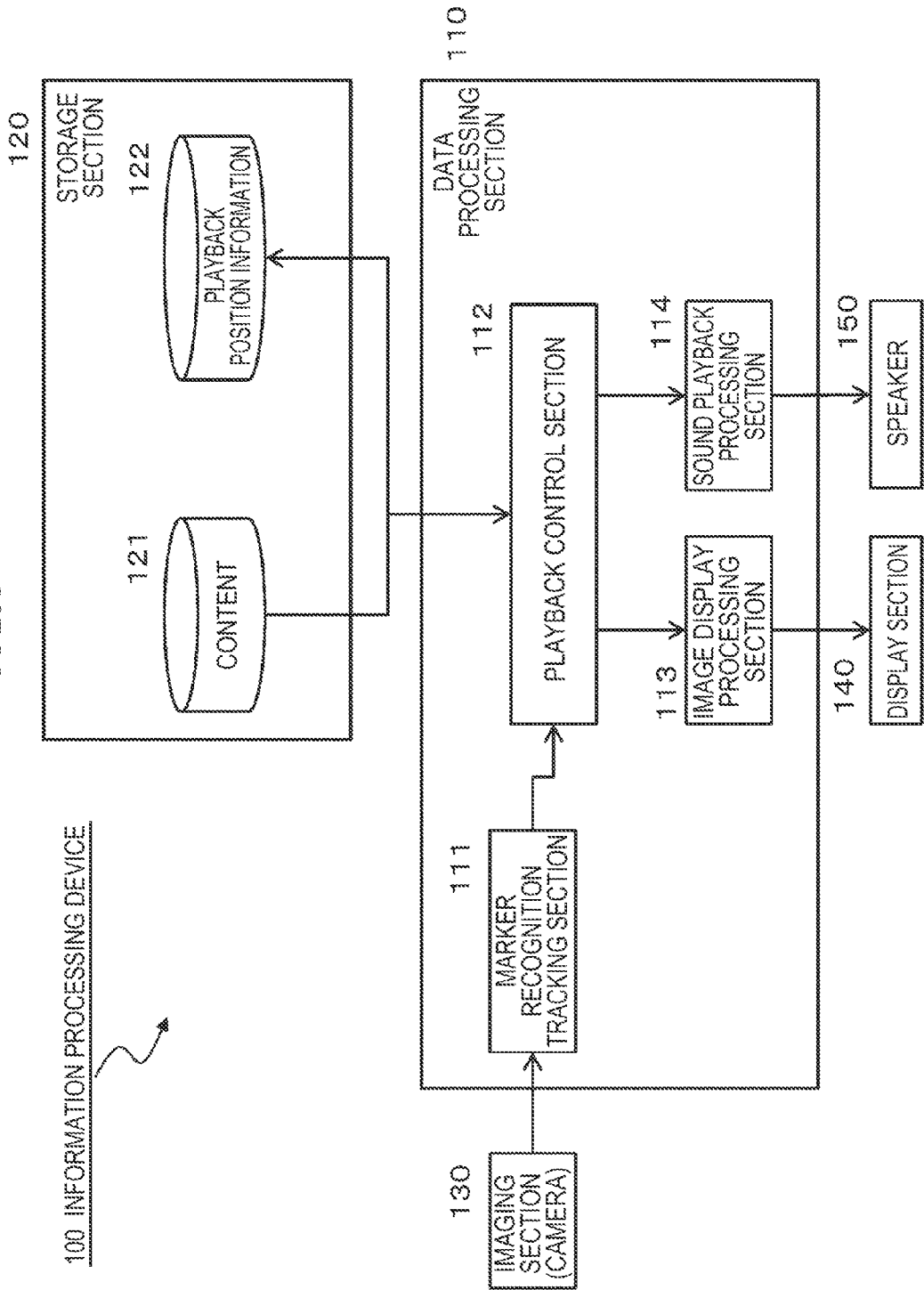
FIG. 7 is a diagram describing a configuration example of the information processing device of the present disclosure.

As illustrated in FIG. 7, the information processing device 100 includes a data processing section 110, a storage section 120, an imaging section (camera) 130, a display section 140, and a speaker 150.

The data processing section 110 includes a marker recognition tracking section 111, a playback control section 112, an image display processing section 113, and a sound playback processing section 114.

Content 121 and playback position information 122 are recorded in the storage section 120.

The processing, which is performed by the respective sections illustrated in FIG. 7, is described in association with the above-described processing of the respective steps of the flowchart illustrated above in FIG. 4.

The imaging section (camera) 130 performs the processing of step S101 of the flow illustrated in FIG. 4, that is, the processing of capturing the camera image.

The marker recognition tracking section 111 performs the processing of step S103 or step S109 of the flow of FIG. 4. That is, the marker is detected from the captured image of the imaging section (camera) 130, and the processing of tracking the detected marker is performed.

As described above, a variety of information, for example, code information such as the cyber-code or specific image information, can be used as the marker.

The playback control section 112 performs the processing of steps S104 to S107 and steps S110 to S115 of the flow illustrated in FIG. 4.

That is, the content playback control is performed by inputting marker recognition result information from the marker recognition tracking section 111.

In the content playback control, the state transition described above with reference to FIG. 3 is performed, and the process of continuously playing back the sound is performed after the playback control described above with reference to FIG. 5 or 6, that is, after the stop of the playback of the image.

Furthermore, in the case of stopping the playback, the processing of recording the playback position information 122 corresponding to the playback stop position in the storage section 120 is performed. At the time of resuming the playback, the processing of acquiring the playback position information 122 stored in the storage section 120 and resuming the playback processing from that position is performed.

Incidentally, the playback content is content 121 of the storage section 120 and is content including the image and sound information.

The image display processing section 113 superimposes image data of the content 121 on the captured image and outputs the superimposed image to the display section 140.

The sound playback processing section 114 outputs sound data of the content 121 through the speaker 150.

When the fade-in and fade-out processing described above with reference to FIG. 6 is performed, the image display processing section 113 and the sound playback processing section 114 perform the level control of the output data according to instructions of the playback control section 112.

Also, as specific hardware configuration, the data processing section 110 can be configured by a control unit with a CPU or the like, and the storage section 120 can be configured by a variety of storage means such as a RAM, a ROM, or a hard disk.

The data processing section 110, which is configured by the CPU or the like, performs the above-described processing according to the flow illustrated above in the drawing by performing the program (application) stored in the storage section 120.

Figure 8:
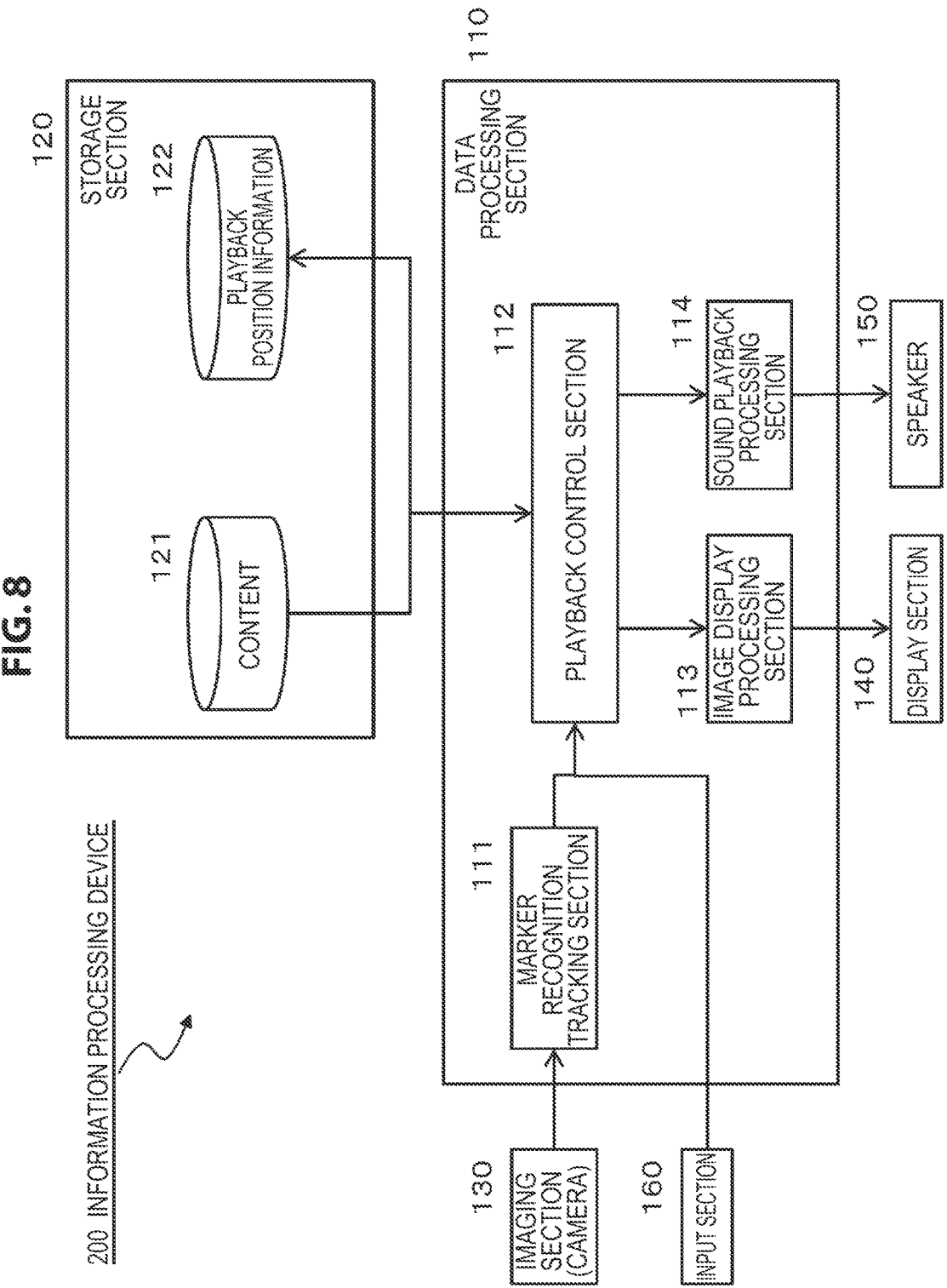
FIG. 8 is a diagram describing a configuration example of the information processing device of the present disclosure.

FIG. 8 illustrates a configuration example of another information processing device 200.

A difference from the information processing device 100 of FIG. 7 is that an input section 160 is included.

The input section 160 notifies the playback control section 112, for example, by inputting a user input so as to determine a processing aspect at the time of the processing of resuming the playback of the content after the stop of the playback of the content.

The playback control section 112 performs processing corresponding to user input information.

For example, (1) Resume processing that performs halfway playback from the playback stop position described in the aforementioned embodiment, or (2) Replay processing that performs the playback of the content from the beginning, instead of the playback stop position One of (1) and (2) can be selectively played back according to the user input.

Specifically, the input section 160 can be realized as a user interface (IF) displayed on the display section 140.

A user interface display example is illustrated in FIG. 9.

In FIG. 9, as UI information, (A) Example in which an icon 251 [Replay] of instructing the playback from the beginning is displayed (B) Example in which an icon 251 [Replay] of instructing the playback from the beginning and an icon 252 [Resume] of instructing the playback from the stop position are displayed These two UI display examples are illustrated.

These UIs are displayed on the display section 140, for example, when the marker is re-detected after the marker-lost.

For example, in the configuration in which only the icon 251 [Replay] of instructing the playback from the beginning, which is illustrated in FIG. 9(A), is displayed, when this icon is touched, the content is played back from the beginning. That is, the playback is not performed from the previous playback stop position, but the playback of the content is performed from the beginning.

When a touch input corresponding to the icon 251 [Replay] of instructing the playback from the beginning, which is illustrated in FIG. 9(A), is not detected for a predetermined time, the processing described in the aforementioned embodiment, that is, the playback from the previous playback stop position, is performed.

This playback control is performed by the playback control section 112.

For example, in the configuration in which the icon 251 [Replay] of instructing the playback from the beginning and the icon 252 [Resume] of instructing the playback from the stop position, which are illustrated in FIG. 9(B), are displayed, when one of the icons is touched, the processing corresponding to the touched icon is performed.

That is, when the touch input of the icon 251 [Replay] of instructing the playback is detected, the content is played back from the beginning.

On the other hand, when the touch input of the icon 252 [Resume] of instructing the playback from the stop position is detected, the playback is performed from the previous playback stop position.

This playback control is performed by the playback control section 112.

Figure 10:
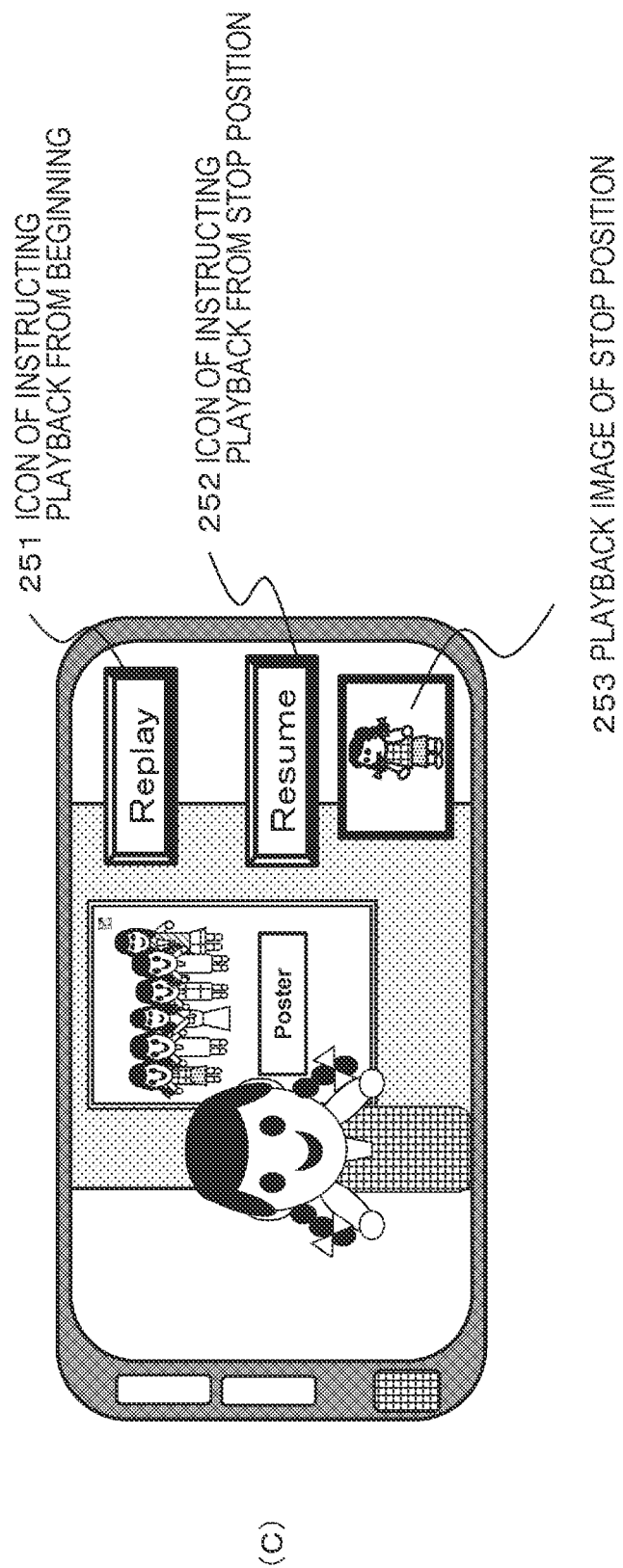
FIG. 10 is a diagram describing an example of the user interface (UI) displayed on the display section of the information processing device of the present disclosure.

Furthermore, as illustrated in FIG. 10, it may be configured such that the playback image at the previous playback stop position is displayed on the display section. A playback image 253 of the stop position is illustrated in FIG. 10.

The user can check the image and select the playback from the playback stop position or the playback from the beginning.

The information processing device 200 illustrated in FIG. 8 is an information processing device that can perform the control corresponding to such a user input.

Figure 11:
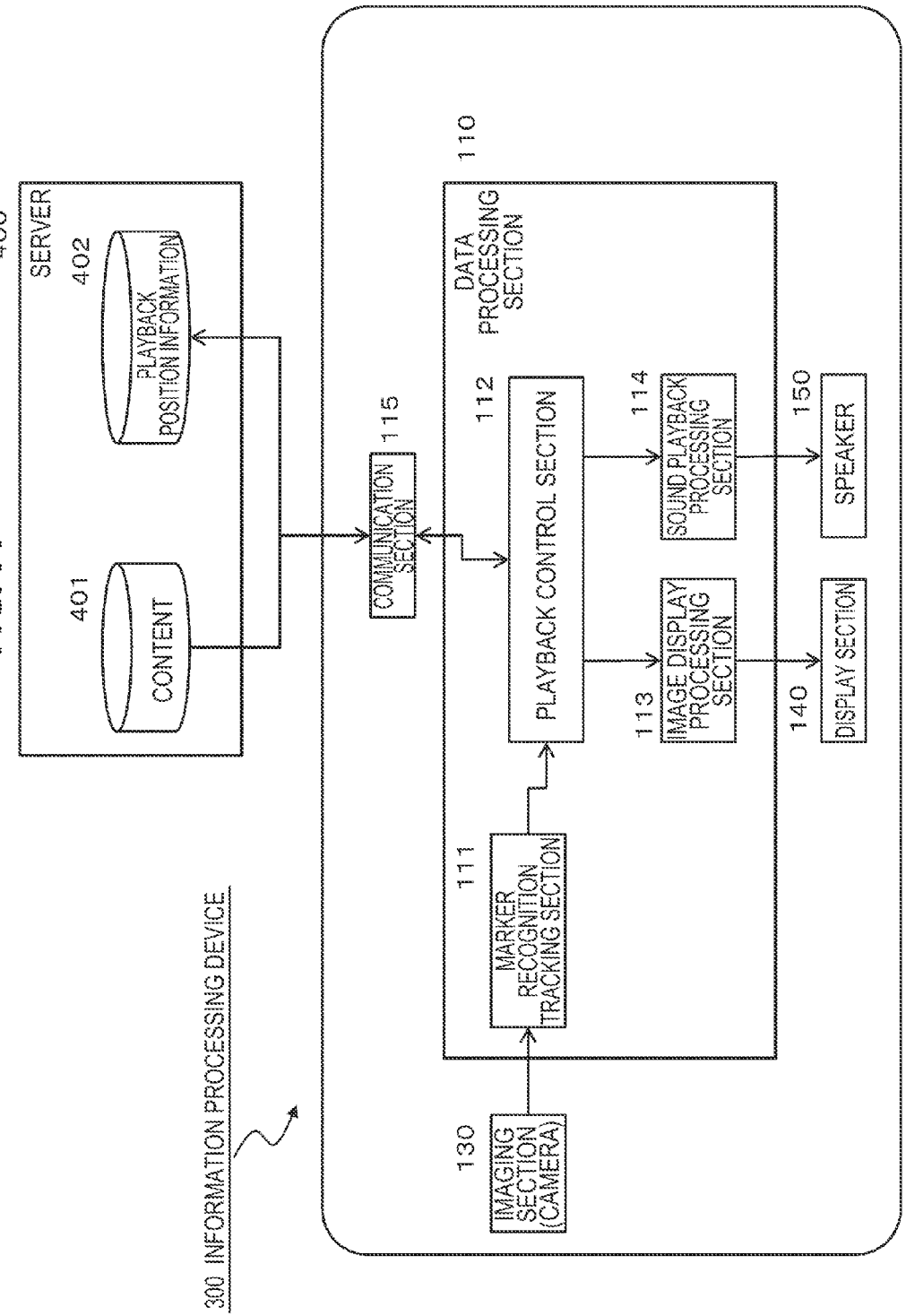
FIG. 11 is a diagram describing a configuration example of the information processing device of the present disclosure.

Furthermore, an information processing device 300 illustrated in FIG. 11 is a configuration example in which content 401 and playback position information 402 are stored in a server 400.

The information processing device 300 performs communication with the server 400 through a communication section 115 and performs playback control by acquiring the content 401 and transmitting and receiving the playback position information 402.

In this case, the playback control is the same processing as the above-described processing based on the flow of FIG. 4.

However, the processing of acquiring the content, or storing or extracting the playback position information is performed by the communication with the server 400 through the communication section 115.

A data processing section 110 of the information processing device 300 as a client performs the playback of the content from the position corresponding to the playback stop position by performing the marker detection from the captured image of the imaging section 130, stopping the playback of the content received from the server 400 at the time of the marker-lost in which the marker detection is impossible, transmitting playback stop position information to the server, and inputting the playback stop position information from the server, with a subsequent marker re-detection as a condition.

Figure 12:
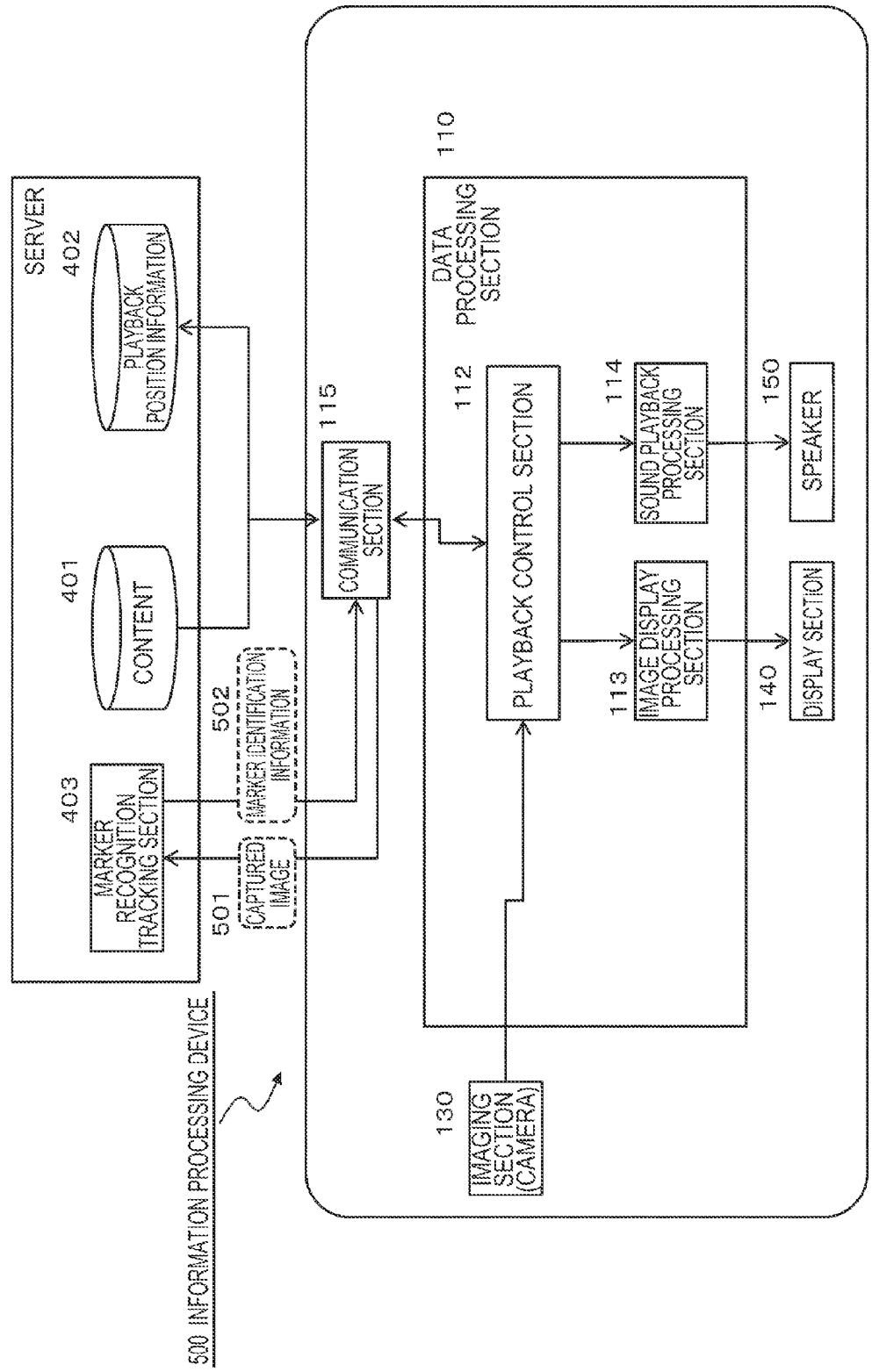
FIG. 12 is a diagram describing a configuration example of the information processing device of the present disclosure.

Furthermore, similar to the configuration illustrated in FIG. 11, an information processing device 500 illustrated in FIG. 12 has a configuration in which content 401 and playback position information 402 are stored in a server 400 and a marker recognition tracking section 403 also is installed in the server 400.

The information processing device 500 performs communication with the server 400 through a communication section 115 and provides a captured image 501 of an imaging section (camera) 130 to the marker recognition tracking section 403 of the server 400.

The marker recognition tracking section 403 of the server 400 identifies the marker from the captured image and provides the information processing device 500 with marker identification information 502 that is the marker identification result.

A playback control section 112 of the information processing device 500 receives the content from the server 400, receives the marker identification information 501, and performs the same processing as the above-described processing based on the flow illustrated in FIG. 4 by using the received marker identification information 501.

In the present configuration, a data processing section 110 of the information processing device 500 as a client transmits the captured image 501 of the imaging section 130 to the server 400 through the communication section 115, receives the marker identification information 502, based on the captured image from the server 400, and performs the playback of the content provided from the server 400.

When the marker detection information from the server indicates the marker-lost representing that the marker detection is impossible, the data processing section 110 stops the playback of the content, transmits the content playback stop position to the server 400 through the communication section 115, acquires the content position information transmitted immediately previously from the server 400 to the server 400, with a subsequent marker re-detection as a condition, and plays back the content from a position corresponding to that position.

This processing configuration greatly reduces the processing load of the information processing device 500.

5. Other Embodiments

In the embodiment described above, the information processing device performs the content playback control according to the marker-lost, that is, the presence or absence of the marker detection from the captured image.

Specifically, the above-described embodiment is the processing example in which the content playback control is performed according to the information indicating whether the marker is detected and the time elapsed from the marker-lost.

The information that triggers the content playback control in the information processing device can be information other than the marker.

Specifically, for example, the following information can be used as the trigger of the content playback control.
(a) Scene information of playback content
(b) Sensor information of information processing device
(c) Incoming call information of information processing device For example, the playback control section of the information processing device may be configured to perform the content playback control by inputting such information.

A specific example of the content playback control processing of triggering the respective information is described.

(a) In the case of using the scene information of the playback content, the playback control section of the information processing device inputs metadata (attribute information) attached and set to the playback content.

For example, when the metadata is metadata indicating a separator of the content, the processing of stopping the content and recording the stop position in the memory is performed.

At the time point of resuming the playback, the control is performed such that the content is resumed from the separator position of the content, the playback of which is stopped.

Also, (b) in the case of using the sensor information of the information processing device, the playback control section of the information processing device inputs the sensor information of the information processing device, for example, acceleration sensor information, stops the playback of the content when the motion of the information processing device is abruptly detected, and records playback stop position information in the memory. This processing is performed, for example, when the user performs processing of storing the information processing device in a pocket.

At the time point of resuming the playback, the control is performed such that the content is resumed from the content playback stop position.

Also, (c) in the case of using the incoming call information of the information processing device, the playback control section of the information processing device inputs the incoming call information of the information processing device, stops the playback of the content when there is an incoming call, and records playback stop position information in the memory. This processing is a control that, for example, when a call is made after the incoming call and the playback is resumed after the end of the call, can resume the content from the content playback stop position.

6. Summary of Configuration of Present Disclosure

The embodiments of the present disclosure have been described in detail with reference specific embodiments. However, it is obvious that modifications or substitutions of the embodiments can be made by those skilled in the art, without departing from the scope of the present disclosure. That is, the present invention is disclosed in the form of examples and should not be construed as limited thereto. The scope of the present disclosure should be determined with reference to the appended claims.

Additionally, the present technology may also be configured as below.

(1)
An information processing device including:
a data processing section configured to perform processing of playing back content according to a feature image, based on detection of the feature image from a captured image acquired by a capturing of an imaging section; and
a specifying section configured to specify a resume point, which is a position of playing back the content, according to a timing at which the detection of the feature image is impossible,
wherein the data processing section performs the playback of the content from a position corresponding to the resume point, according to re-detection of the feature image after the detection of the feature image becomes impossible.

(2)
The information processing device according to (1),
wherein the data processing section performs processing of superimposedly displaying image data constituting the content on the captured image of the imaging section in the content playback processing.

(3)
The information processing device according to (1) or (2),
wherein the content is content that includes an image and a sound, and
wherein, when the detection of the feature image becomes impossible, the data processing section stops the playback of only the image and continuously plays back the sound.

(4)
The information processing device according to any one of (1) to (3),
wherein the data processing section measures a time elapsed from a time when the detection of the feature image becomes impossible, and stops the playback of the sound when the elapsed time exceeds a preset threshold time.

(5)
The information processing device according to any one of (1) to (4), wherein the data processing section acquires the resume point from memory, with the re-detection of the feature image as a condition, and performs the playback of the content including the image and the sound from an acquired content position.

The information processing device according to any one of (1) to (6), wherein, when the detection of the feature image becomes impossible, the data processing section performs fade-out processing of lowering a content output level with the passage of time.

(7)

The information processing device according to any one of (1) to (6), wherein upon the re-detection of the feature image, the data processing section performs fade-in processing of increasing a content output level with the passage of time.

(8)

The information processing device according to any one of (1) to (7), wherein the data processing section inputs instruction information of selecting either of (a) resume processing of playing back the content from the resume point stored in memory or (b) replay processing of playing back the content from beginning, as an aspect of the content playback processing upon the re-detection of the feature image, and performs the playback of the content according to input information.

(9)

The information processing device according to any one of (1) to (8), wherein the data processing section displays, on a display section, a user interface allowing input of instruction information of selecting either of (a) resume processing of playing back the content from the resume point stored in memory or (b) replay processing of playing back the content from beginning, as an aspect of the content playback processing upon the re-detection of the feature image.

(10)

The information processing device according to any one of (1) to (9), wherein the feature image is an identification mark included in the captured image.

(11)

The information processing device according to any one of (1) to (10), wherein the data processing section perform processing of stopping the playback of the content according to input of scene information of the playback content, or sensor information of the information processing device, or incoming call information of the information processing device, and recording a content position at which the playback is stopped in memory (12)

An information processing device including:

an imaging section configured to capture an image;

a communication section configured to perform communication with a server; and a data processing section configured to perform detection of a feature image from a captured image of the imaging section and perform playback of content provided from the server, wherein, when the detection of the feature image from the captured image becomes impossible, the data processing section stops the playback of the content received from the server and transmits a playback stop position to the server as resume point information, and inputs the resume point information from the server, with a subsequent re-detection of the feature image as a condition, and performs the playback of the content from the resume point position.

(13)

An information processing device including:

an imaging section configured to capture an image;

a communication section configured to perform communication with a server; and a data processing section configured to transmit a captured image of the imaging section to the server through the communication section, receive feature image detection information from the server, based on the captured image, and performs the playback of the content provided from the server, wherein, when the feature image detection information from the server indicates that the detection of the feature image is impossible, the data processing section stops the playback of the content, transmits a content position, at which the playback is stopped, to the server through the communication section as resume point information, receives the content from a position corresponding to the resume point position from the server, with a subsequent re-detection of the feature image as a condition, and plays back the received content.

(14)

A server including:

a communication section configured to perform communication with a client;

a storage section configured to store content to be provided to the client; and a data processing section configured to perform processing of detecting a feature image from a captured image of the client and processing of providing content, wherein the data processing section performs the processing of detecting the feature image from the captured image of the client and provides feature image detection information to the client.

Furthermore, a method of processing performed in the above-described device and system, or a program for performing the processing are also included in the configuration of the present disclosure.

Also, for example, the configuration described in Section (1) may be a configuration of a terminal of a user side, but may also be a configuration of a server that communicates with a user terminal.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

Industrial Applicability

As described above, according to the configuration of one embodiment of the present disclosure, the improved playback control is realized at the time of the marker-lost and upon the marker re-detection in the content playback processing according to the feature image such as the marker.

Specifically, the feature image such as the marker is detected from the captured image of the imaging section, and the content is played back according to the marker detection. At the time of the marker-lost in which the marker detection from the captured image is impossible, the playback of the content is stopped, the content playback stop position is recorded in the memory, the content position is acquired from the memory, with a subsequent marker re-detection as a condition, and the content is played back from the acquired content position. The content is content that includes an image and a sound. The playback of only the image is stopped at the time of the marker-lost and the playback of the sound is continued. When the time elapsed from the time of the marker-lost exceeds the preset threshold time, the playback of the sound is stopped.

According to these configurations, the improved playback control is realized at the time of the marker-lost and the marker re-detection in the content playback processing according to the marker.

REFERENCE SIGNS LIST 10 poster
11 marker
21 user
30 information processing device (portable terminal)
31 playback virtual image
32 playback sound
100 information processing device
110 data processing section
111 marker recognition tracking section
112 playback control section
113 image display processing section
114 sound playback processing section
120 storage section
121 content
122 playback position information
130 imaging section (camera)
140 display section
150 speaker
160 input section
200 information processing device
300 information processing device
400 server
401 content
402 playback position information
403 marker recognition tracking section
500 information processing device

The invention claimed is:
1. An information processing device, comprising:
one or more processors configured to:
process play back content based on a detection of a feature image from a captured image;
specify a resume point, which is a position of playing back the content, based on a timing of a lack of the detection of the feature image;
playback the content from a position corresponding to the resume point, based on a re-detection of the feature image after the lack of the detection of the feature image,
wherein the content includes an image and a sound, and stop the playback of the image and continuously playback the sound based on the lack of the detection of the feature image.

2. The information processing device according to claim 1,
wherein the one or more processors are further configured to process superimposedly displayed image data constituting the content on the captured image in the content playback process.

3. The information processing device according to claim 1,
wherein the one or more processors are further configured to measure a time elapsed from a time based on the lack of the detection of the feature image from the captured image, and stop the playback of the sound based on the elapsed time that exceeds a threshold time.

4. The information processing device according to claim 1,
wherein the one or more processors are further configured to acquire the resume point from memory, with the re-detection of the feature image as a condition, and playback the content including the image and the sound from an acquired content position.

5. The information processing device according to claim 1,
wherein, based on the lack of the detection of the feature image from the captured image, the one or more processors are further configured to execute a fade-out process to lower a content output level with passage of time.

6. The information processing device according to claim 1,
wherein upon the re-detection of the feature image, the one or more processors are further configured to execute a fade-in process to increase a content output level with passage of time.

7. The information processing device according to claim 1,
wherein the one or more processors are further configured to input instruction information for selection of at least one of a resume process that plays back the content from the resume point stored in memory or a replay process that plays back the content from beginning, as an aspect of the content playback process upon the re-detection of the feature image, and playback the content based on input information.

8. The information processing device according to claim 1,
wherein the one or more processors are further configured to display, a user interface which allows input of instruction information for selection of at least one of a resume process that plays back the content from the resume point stored in memory or a replay processing that plays back the content from beginning, as an aspect of the content playback process upon the re-detection of the feature image.

9. The information processing device according to claim 1,
wherein the feature image is an identification mark included in the captured image.

10. The information processing device according to claim 1,
wherein the one or more processors are further configured to stop the playback of the content based on at least one of an input of scene information of the playback content, sensor information of the information processing device, or incoming call information of the information processing device, and record a content position at which the playback is stopped in memory.

11. An information processing device, comprising:
one or more processors configured to:
capture an image;
communicate with a server;
detect a feature image from the captured image and playback content provided from the server;
stop the playback of the content received from the server, transmit a playback stop position to the server as resume point information, input the resume point information from the server, with a subsequent re-detection of the feature image as a condition, and playback the content from the resume point position based on a lack of the detection of the feature image from the captured image;
wherein the content includes an image and a sound, and
stop the playback of the image and continuously playback the sound based on the lack of the detection of the feature image from the captured image.

12. An information processing device, comprising:
one or more processors configured to:
capture an image;
communicate with a server;
transmit the captured image to the server, receive feature image detection information from the server, based on the captured image, and playback content provided from the server;
stop the playback of the content, transmit a content position, at which the playback is stopped, to the server as resume point information, receive the content from a position corresponding to the resume point position from the server, with a subsequent re-detection of the feature image as a condition, and play back the received content based on a lack of a detection of the feature image from the server,
wherein the content includes an image and a sound; and
stop the playback of the image and continuously playback the sound based on the lack of the detection of the feature image from the captured image.

13. A server, comprising:
one or more processors configured to:
communicate with a client;
store content to be provided to the client;
detect a feature image from a captured image of the client and process the content;
the feature image from the captured image of the client and provide feature image detection information to the client,
wherein the content includes an image and a sound; and
stop playback of the image and continuously playback the sound based on lack of detection of the feature image from the captured image.

14. An information processing method, comprising:
in an information processing device:
processing, by one or more processors of the information processing device, of playing back content based on a detection of a feature image from a captured image,
specifying, by the one or more processors, a resume point, which is a playback position of the content, based on a timing of a lack of the detection of the feature image,
playing back the content, by the one or more processors, from a position corresponding to the resume point, based on a re-detection of the feature image after the lack of the detection of the feature image from the captured image,
wherein the content includes an image and a sound, and
stopping, by the one or more processors, the playback of the image and continuously playing back the sound based on the lack of the detection of the feature image from the captured image.

15. A non-transitory computer-readable medium having stored thereon computer-readable instructions, which when executed by a computer, cause the computer to execute operations, the operations comprising:
processing of playing back content based on detection of a feature image from a captured image,
specifying a resume point, which is a playback position of the content, based on a timing of a lack of the detection of the feature image,
playing back the content from a position corresponding to the resume point, based on a re-detection of the feature image after the lack of the detection of the feature image from the captured image
wherein the content includes an image and a sound, and
stopping the playback of the image and continuously playing back the sound based on the lack of the detection of the feature image from the captured image.

* * * * *